(12) United States Patent
Hazzard et al.

(10) Patent No.: US 7,756,737 B2
(45) Date of Patent: Jul. 13, 2010

(54) USER-BASED METHOD AND SYSTEM FOR EVALUATING ENTERPRISE SOFTWARE SERVICES COSTS

(75) Inventors: Timothy A. Hazzard, Plano, TX (US); Kevin D. Ivey, The Colony, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1972 days.

(21) Appl. No.: 10/738,819

(22) Filed: Dec. 17, 2003

(65) Prior Publication Data

US 2005/0138599 A1 Jun. 23, 2005

(51) Int. Cl.
*G06F 17/66* (2006.01)
(52) U.S. Cl. .......................................... 705/8; 705/11
(58) Field of Classification Search ............... 705/8
See application file for complete search history.

(56) References Cited

U.S. PATENT DOCUMENTS

| | | | |
|---|---|---|---|
| 6,477,531 B1 * | 11/2002 | Sullivan et al. ............... 707/10 |
| 6,542,601 B1 * | 4/2003 | Hernandez et al. ...... 379/265.01 |
| 6,574,615 B1 * | 6/2003 | Huber et al. .................... 707/1 |
| 6,765,593 B2 * | 7/2004 | Simmons ..................... 715/763 |
| 6,938,027 B1 * | 8/2005 | Barritz et al. .................. 706/50 |
| 2004/0064731 A1 * | 4/2004 | Nguyen et al. .............. 713/201 |

* cited by examiner

*Primary Examiner*—Jonathan G. Sterrett
*Assistant Examiner*—Thomas Mansfield

(57) ABSTRACT

A user-based method and system for evaluating enterprise software costs determines a support level for the integrated provision of a plurality of enterprise software support services by identifying a plurality of usage levels associated with each of a plurality of enterprise software support applications. The method and system identify a plurality of software services support levels associated with each of the usage levels. Then, a formulaic relationship is derived from the plurality of usage levels and the plurality of software services for determining a software services support level for a given usage level that is appropriate for a subset of said plurality of enterprise software support applications. The ability to dynamically change user levels, complexity variables, database size, and software services enables dynamical and precise software services business consulting in providing such services.

17 Claims, 5 Drawing Sheets

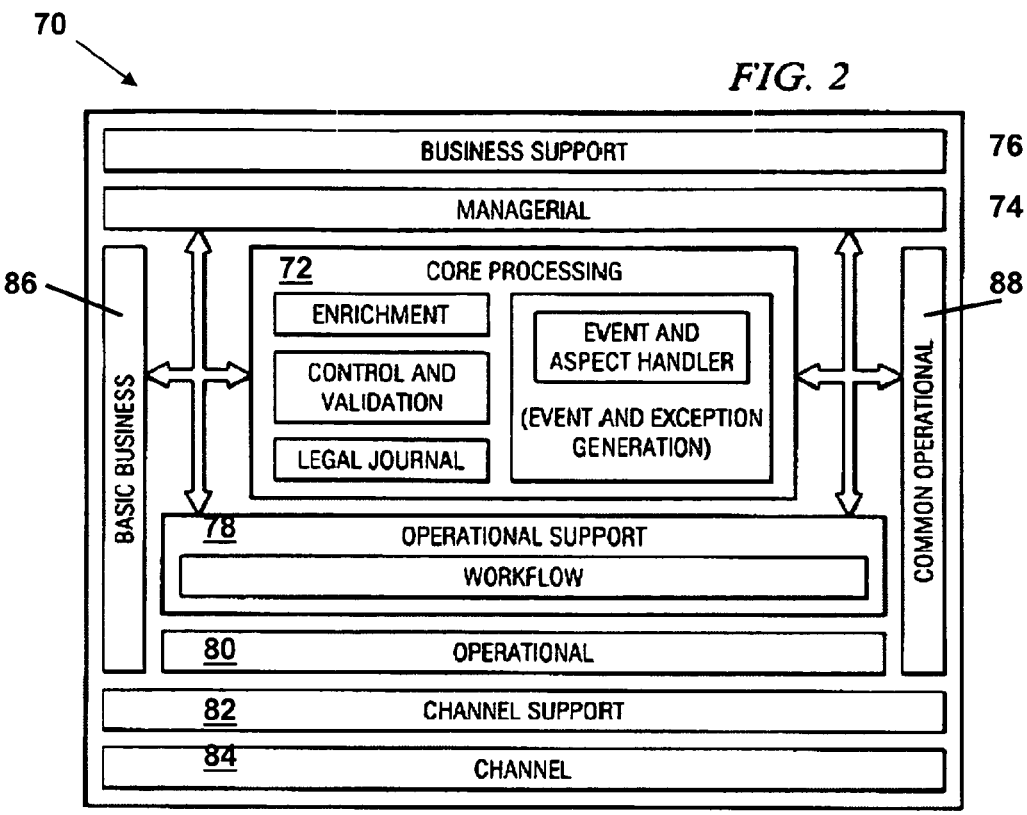

| Problem Management 92 | After Hours Support 94 | Standard Printer Administration 96 |
|---|---|---|
| Language Transport And Administration | General Administration | CCMS Setup and Admin |
| Client Copy and Admin | Instance Copy | Maintenance Planning |
| Automated Monitoring and Alert Problem Resolution | System Monitoring | Change Management |
| Transports | Kernel Upgrades | Support Packs |
| Logbook Maintenance | Technical Consulting | Support and Dev Team Consulting |
| Database Management | Hosting Integration Consulting | Solution Manager Support |
| DB Upgrades | Customer Meetings | Customer Reporting |
| Version Release Upgrades | Added Instance Support | Additional Language Support |
| Interface Support | Support Packs | Plug In Support |
| Add-on Support | Troubleshooting | GUI Installation Support |
| Database Security and User Management | High Availability Support | |

100

| # Users | Esimated FTE/User | Constant | Exponent | Calculated FTE/USER | Calculated vs. Estimated | Total FTE | Total Hours |
|---|---|---|---|---|---|---|---|
| 102 | 104 | 106 | 108 | 110 | 112 | 114 | 116 |
| 50 | 0.0007185628743 | 0.0057 | -0.6128 | 0.0005185 | 72% | 0.036 | 6 |
| 100 | 0.0003592814371 | 0.0057 | -0.6128 | 0.0003391 | 94% | 0.036 | 6 |
| 200 | 0.0001796407186 | 0.0057 | -0.6128 | 0.0002217 | 123% | 0.036 | 6 |
| 300 | 0.0001197604790 | 0.0057 | -0.6128 | 0.0001729 | 144% | 0.036 | 6 |
| 400 | 0.0000898203593 | 0.0057 | -0.6128 | 0.0001450 | 161% | 0.036 | 6 |
| 500 | 0.0000718562874 | 0.0057 | -0.6128 | 0.0001265 | 176% | 0.036 | 6 |
| 600 | 0.0000998003992 | 0.0057 | -0.6128 | 0.0001131 | 113% | 0.06 | 10 |
| 700 | 0.0000855431993 | 0.0057 | -0.6128 | 0.0001029 | 120% | 0.06 | 10 |
| 800 | 0.0000748502994 | 0.0057 | -0.6128 | 0.0000948 | 127% | 0.06 | 10 |
| 900 | 0.0000665335995 | 0.0057 | -0.6128 | 0.0000882 | 133% | 0.06 | 10 |
| 1000 | 0.0000598802395 | 0.0057 | -0.6128 | 0.0000827 | 138% | 0.06 | 10 |
| 1500 | 0.0000399201597 | 0.0057 | -0.6128 | 0.0000645 | 162% | 0.06 | 10 |
| 2000 | 0.0000299401198 | 0.0057 | -0.6128 | 0.0000541 | 181% | 0.06 | 10 |
| 4000 | 0.0000299401198 | 0.0057 | -0.6128 | 0.0000354 | 118% | 0.12 | 20 |
| 6000 | 0.0000199600798 | 0.0057 | -0.6128 | 0.0000276 | 138% | 0.12 | 20 |
| 10000 | 0.0000239520958 | 0.0057 | -0.6128 | 0.0000202 | 84% | 0.24 | 40 |
| 15000 | 0.0000199600798 | 0.0057 | -0.6128 | 0.0000157 | 79% | 0.299 | 50 |

$y = 0.0046x^{-0.6128}$

US 7,756,737 B2

USER-BASED METHOD AND SYSTEM FOR EVALUATING ENTERPRISE SOFTWARE SERVICES COSTS

TECHNICAL FIELD OF INVENTION

The invention, in general, relates to a method and system for evaluating enterprise software services costs according to an enterprise user base and, more particularly to an enterprise software costing method and system for determining costs associated with using and maintaining enterprise software support applications and the like.

BACKGROUND OF THE INVENTION

Many companies underestimate the cost of managing software applications and systems supporting their software applications. In fact, the annual costs of administering software applications and the cost of managing issues around performance, changes and availability, most likely represent significantly greater costs than do the original software application purchase prices. Understanding the cost of software, therefore, means tracking all related expenditures across an application's life cycle. This may include purchase or lease payments, implementation expenditures, training costs, support and maintenance fees, as well as subsequent upgrades for essentially every major software application.

In today's business environment, however, assessing and understanding the true costs of software is much easer said than done. To confound the problem, some system integrators deliberately obfuscate the whole price issue by bundling the cost of the software in with their services, quoting one, all-inclusive price for their integrated system. For large organizations, these custom integration projects often run into lump sums of millions of dollars. However, these organizations still have no idea how that lump sum is divided and expended.

Another problem with existing enterprise software support applications costing models relates to most costs models being constructed as original models at the time that an enterprise considers purchasing these software applications. As such, no standard approach is known for considering the many variables associated with the different services an enterprise may require, the different numbers and types of users within an enterprise, the different sizes of databases with which the software services must interface, or the different complexities inherent in serving a particular enterprise. Accordingly, a software service cost estimate from one software application service provider simply cannot be compared reliably with a software service cost estimate from another software application service provider. This lack of reliable standards in estimating software service costs results in market confusion, inefficient pricing models, and losses on both sides of the software service transaction.

One attempt to address this concern requires software application purchasers to pay for software licenses and the services associated with enterprise software support applications under a tiered structure. These tiers reflect graduated numbers of users who are likely to use the application. However, due to many circumstances, it is not infrequent that an enterprise will purchase more software application licenses and more support service resources than they require, on the one hand. On the other hand, it is not infrequent that more than the licensed number of employees will access and use a licensed software application. This can result in both breach of the software license and an unjust benefit to the licensee.

A still further problem with known ways of providing enterprise software support applications is a general inability to dynamically take into consideration that the enterprise using these software applications are vibrant, changing, evolving entities. Companies acquire other companies, change as their market changes, and add and remove employees every day. As a result, oftentimes in an application services environment the need arises to reconstitute, rearrange, and otherwise manage the provision of software services supporting a particular enterprise as the enterprise changes.

For these reasons, there is a need to relate both the enterprise software applications and the services supporting the software applications more closely to needs of the enterprise base of software system users.

Historically, the process for assessing the needs for, and associated costs of, enterprise system software support and maintenance has been to use a single solution for a single set of problems. That is, the way of deriving estimates relating users to support service requirements has been an ad hoc or, at best, a straight line method. Such methods seek to extrapolate costs derived from a first set of users and an associated observed service support level to costs expected from a second different set of users with different requirements and usage patterns.

Unfortunately, an enterprise does not change in a straight-line path, so attempting to assess or estimate software application support and maintenance costs in a straight-line path fails as a management tool. Such a practice derives, at best, a very rough approximation and, at worst, a totally fallacious and misleading value. Inaccuracies can result in either an unjust or undue cost for the enterprise or, alternatively, a significantly reduced profit margin for the enterprise software support applications provider. As should be expected, using such fallacious and misleading cost information for important and pivotal business decisions can have highly detrimental results.

Accordingly, there is a need for an improved process for achieving reliable cost estimates for use in budgeting and monitoring the costs of enterprise software support applications support.

A need exists, therefore, for an improved method and system for evaluating enterprise software costs according to the user base of a given enterprise.

A further need exists for an enterprise software costing method and system that determines costs associated with using and maintaining an integrated-set of enterprise software support applications.

SUMMARY OF THE INVENTION

The invention, therefore, provides a method and system for evaluating enterprise software services costs according to the enterprise user base that overcomes or substantially eliminates problems associated with prior known methods and systems for determining the costs of using, supporting, and maintaining software systems for a wide variety of enterprise applications.

According to one aspect of the invention, there is provided an enterprise software costing method and system for determining costs associated with using and maintaining an integrated plurality of enterprise software support systems. The present invention includes a method and system for evaluating enterprise software costs determines a support level for the integrated provision of a plurality of enterprise software support services by identifying a plurality of usage levels associated with each of a plurality of enterprise software support applications. The method and system identify a plurality of software services support levels associated with each of the usage levels. Then, a formulaic relationship is derived from the plurality of usage levels and the plurality of software services for determining a software services support level for a given usage level that is appropriate for a subset of said plurality of enterprise software support applications. The ability to dynamically change user levels, complexity variables, database size, and software services enables dynamical and precise software services business consulting in providing such services.

According to another aspect of the present invention, there is provided a scalable method and system for determining support requirements and costs for enterprise software systems management. The mathematical formulas of the present invention map, in one embodiment, over 130 relationships curves services associated with numerous software applications service providers, such as SAP, Oracle, Peoplesoft, J D Edward and Siebel. The present invention provides a relationship of the enterprise user base and associated program features, and ultimately to the total support required for enterprise software support applications. The present invention separately analyzes support and maintenance levels for each enterprise software support application and, then, integrates the results these analyses. The method and system provide the integrated solution as a single comprehensive number estimating the costs of using all of employed enterprise software support applications within an enterprise.

The present invention, therefore, provides a utility-based formulaic relationship that permits modeling the relationship between support levels and software system complexity in the user base of any enterprise using or considering using enterprise software support applications. By providing a more precise model of the support level costing function, the present invention enables greater accuracy and accountability in the assessment and measurement an enterprises success in managing software. As a result, the present invention has the ability to serve as a software industry de facto standard for assessing and improving the maturity of processes guiding software development, testing and implementation.

Other aspects of the present invention include the ability to provide quickly and reliably cost and price complete solutions to potential clients. The present invention also facilitates decisions leading to the purchase of different or additional enterprise software support applications. The present invention provides a proven way to cost enterprise software support applications hosting, to remove costly errors occurring in the sale and support of enterprise software support applications, to avoid wrong decisions due to lack of knowledge of the product suite, and to bring consistency into the process of installing and using enterprise software support applications.

A technical advantage of the present invention is that it provides a formula-based view of the correlation between a user base and the support services that an enterprise may require for making available to that user base the enterprise software support applications that the user base may demand. By virtue of providing a regression-based curve relating the user base to the support level, increased accuracy occurs in both the cost and the support levels required for supporting enterprise software support applications within an enterprise.

A further technical advantage of the present invention is providing a dynamic, single-number software support estimate, such as a full-time equivalent manpower estimate, that automatically analyzes the complexities of an enterprise and its user base for all of the different types of enterprise software support applications that an enterprise may host as part of its integrated enterprise software system. Using a formulaic relationship that correlates the user base, the various enterprise software programs and the required service level, the present invention replicates for each new application of enterprise software programs a meaningful, quickly-derived, reliable estimate of the support level. This eliminates repetitive cost model generation or straight-line estimates. Moreover, the present invention dynamically considers and integrates the various service components for the enterprise software support applications within an enterprise software system.

Another technical advantage of the present invention is avoiding the need to originally generate an enterprise cost model for each newly considered enterprise. In other words, inherent in the cost model formulation of the present invention is the ability to generate dynamically a reliable estimate of support level effort and costs.

Still further technical advantages of the present invention include numerous efficiencies that arise for summarizing the results of all of the services based on the user count entered and enterprise software support applications required. The present invention factors in complexities in both the software application and enterprise database, which factors a user may select using a menu-driven template. The present invention provides a full-time equivalent support technician value that is standardized globally for creating global solutions presentations and explanations by a single region sales or software training team.

Other technical advantages are readily apparent to one skilled in the art from the following FIGUREs, description, and claims.

BRIEF DESCRIPTION OF THE DRAWINGS

For a more complete understanding of the present invention and advantages thereof, reference is now made to the following description, which is to be taken in conjunction with the accompanying drawings and in which like reference numbers indicate like features and further wherein:

FIG. 2 shows an architectural view of an enterprise software services environment in which the present invention may be employed to evaluate enterprise software support and maintenance costs;

FIG. 3 presents an exemplary listing of software support services for an applications hosting service for which the present invention may provide costing software services;

DETAILED DESCRIPTION OF PREFERRED EMBODIMENT

The preferred embodiment of the present invention and its advantages are best understood by referring to FIGS. 1 through 7 of the drawings, like numerals being used for like and corresponding parts of the various drawings.

Figure 1:
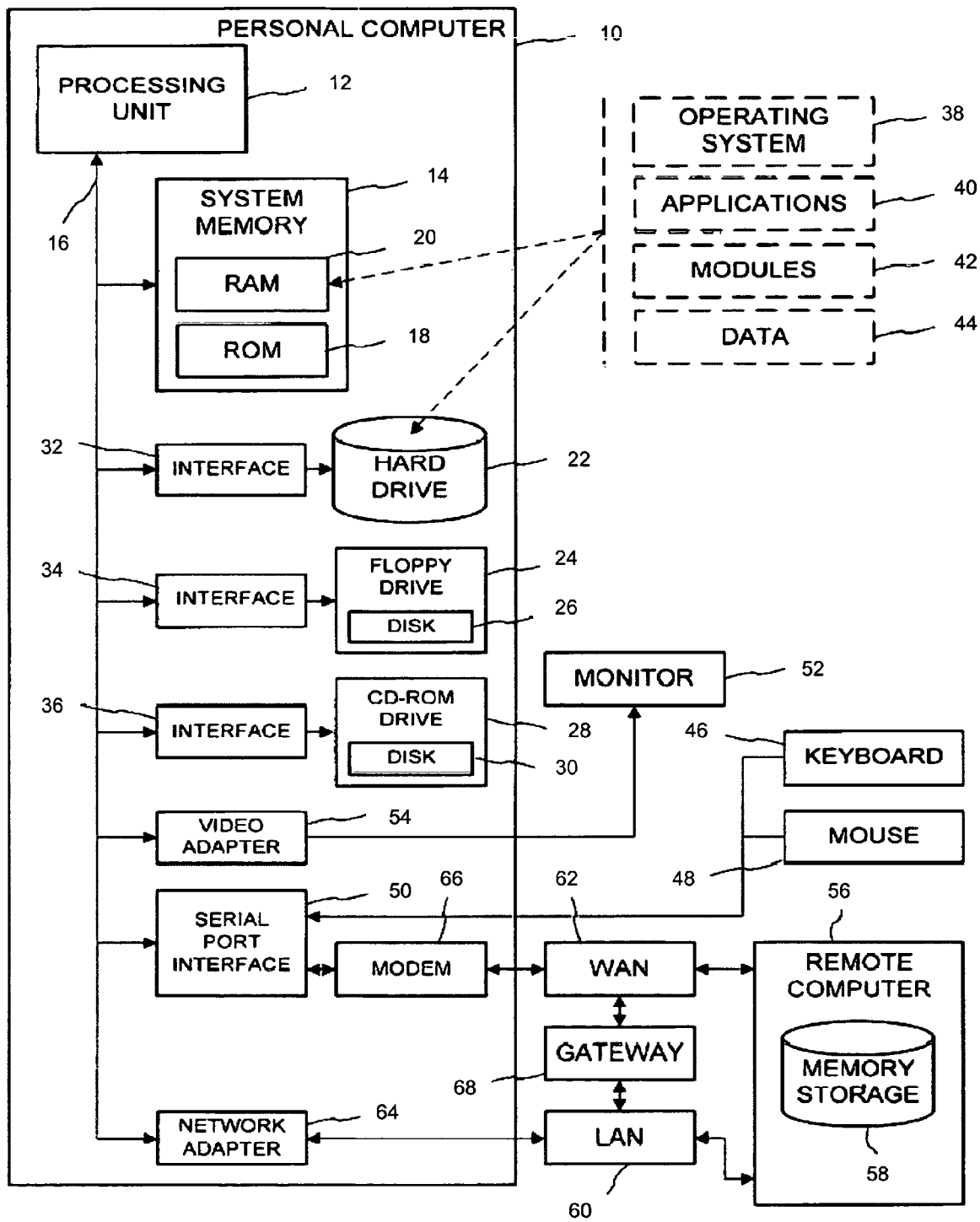
FIG. 1 illustrates a general purpose computing system that may be part of a network of such computing systems for employing the method and system of the present invention.

FIG. 1 illustrates a general purpose computing system that may be part of an enterprise network of such computing systems that use an integrated enterprise software application set and on which to practice the present invention's method and system or evaluating enterprise software costs according to the enterprise user base. By supplying the parameters associated with use of an enterprise software system architecture, such as that of FIG. 2, the present invention provides a more precise measure of the costs and service level effort required for supporting and maintaining enterprise software support applications.

With reference to FIG. 1, therefore, general-purpose computer 10 may be a personal computer, a laptop, palmtop, or other set top, server, mainframe, and other variety computer, and include processing unit 12, system memory 14, and system bus 16 coupling various system components including system memory 14 to the processing unit 12. Processing unit 12 may be any of various commercially available processors, including Intel x86, Pentium® and compatible microprocessors from Intel® and others, including Cyrix®, AMD® and Negev®; MIPS® from MIPS Technology®, NEC®, Sidemen's ®, and others; and the PowerPC® from IBM and Motorola. Dual microprocessors and other multi-processor architectures also can be used as processing unit 12.

System bus 16 may be any of several types of bus structures including a memory bus or memory controller, a peripheral bus, and a local bus using any of a variety of conventional bus architectures such as PCI, VESA, AGP, Micro channel, ISA and EISA, to name a few. System memory 14 includes read only memory (ROM) 18 and random access memory (RAM) 20. ROM 18 stores a basic input/output system (BIOS) containing the basic routines helping to transfer information between elements within the computer 10, such as during start-up.

Computer 10 further includes a hard disk drive 22, a floppy drive 24, e.g., to read from or write to a removable disk 26, and CD-ROM drive 28, e.g., for reading a CD-ROM disk 30 or to read from or write to other optical media. The hard disk drive 22, floppy drive 24, and CD-ROM drive 28 are connected to the system bus 16 by a hard disk drive interface 32, a floppy drive interface 34, and an optical drive interface 36, respectively. The drives and their associated computer-readable media provide nonvolatile storage of data, data structures, computer-executable instructions, etc., for computer 10. Although the description of computer-readable media provided above refers to a hard disk, a removable floppy and a CD, those skilled in the art may appreciate other types of media which are readable by a computer, such as magnetic cassettes, flash memory cards, digital video disks, Bernoulli cartridges, and the like, being used in the exemplary operating environment.

A number of program modules, including numerous enterprise software applications, may be stored in the drives and RAM 20, including an operating system 38, one or more application programs 40, other program modules 42, and program data 44. A consumer may enter commands and information into computer 10 through a keyboard 46 and pointing device, such as mouse 48. Other input devices (not shown) may include a microphone, joystick, game pad, satellite dish, scanner, or the like. These and other input devices are often connected to the processing unit 12 through a serial port interface 50 coupling to the system bus, but possibly connecting by other interfaces, such as a parallel port, game port or a universal serial bus (USB). A monitor 52 or other type of display device is also connected to the system bus 16 via an interface, such as a video adapter 54. In addition to the monitor, computers typically include other peripheral output devices (not shown), such as speakers and printers.

Computer 10 may operate in a networked environment using logical connections to one or more remote computers, such as a remote computer 56. Remote computer 56 may be a server, a router, a peer device or other common network node, and typically includes many or all of the elements described relative to general-purpose computer 10, although only a memory storage device 58 has been illustrated in FIG. 1. The logical connections depicted in FIG. 1 include a local area network (LAN) 60 and a wide area network (WAN) 62. Such networking environments are commonplace in offices, enterprise-wide computer networks, intranets and the Internet.

When used in a LAN networking environment, the computer 10 is connected to the LAN 60 through a network interface or adapter 64. When used in a WAN networking environment, computer 10 typically includes a modem 66 or other means for establishing communications (e.g., via the LAN 60 and a gateway or proxy server) over the wide area network 62, such as the Internet. Modem 66, which may be internal or external, is connected to the system bus 16 via the serial port interface 50. In a networked environment, program modules depicted relative to the computer 10, or portions thereof, may be stored in the remote memory storage device 58.

Those skilled in the art may appreciate the network connections shown as exemplary, wherein other means of establishing a communications link between the computers may be used. FIG. 1 only provides one example of a computer useful for employing the teachings of the present invention. The invention may be used in computers other than general-purpose computers, as well as on general-purpose computers without conventional operating systems.

Understanding an enterprise software system architecture facilitates an appreciation of present invention's method and system for evaluating enterprise software support applications costs according to an enterprise user base. FIG. 2, therefore, conceptually shows integrated enterprise architecture 70 as reflecting operations for accomplishing particular enterprise business objectives. Enterprise architecture 70 relates to an enterprise's organizational structure, business processes, workflow scenarios, business concepts, IT investment and expenditure profile, and the enterprise operating environment within which they all exist. Integrated enterprise architecture 70 includes an interface between core processor 72 and managerial applications 74 and business support applications 76. Core processor 72 is supported by operational support applications 78, which further relate to operational applications 80. Associated with operational applications 80 are channel support applications 82 which communicate with different channels 84 within enterprise architecture 70. On a functional basis, core processor 72 also interfaces and communicates with basic business applications 86 and common operational applications 88. Core processor 72 still further interfaces with operational support applications 78, which provide workflow support for operational applications 80.

Managerial applications 74 include applications for different managerial reports and functions, such as financial management and reporting, enterprise asset fund management, sales and marketing processing, risk analysis, and performance management. These applications also interface with the various business processes of business support applications 76, such as those processes for measuring and recording fixed assets, inventory logistics, human resource management aspects, procurement services, service management and archiving necessary for business support.

The operational processes of operational support applications 78 may include different processes for supporting workflow between operational applications 80 and core processor 72. Operational applications 80 also provide different functions such as trade finance, leasing, input system, asset portfolio management, pay and receiving functions, trading and dealing and global custody of information and resources. Moreover, different operational applications may include programs for collateral and credit factoring processing, as well as different types of processes for insurance functions, deposit accounts, trust accounts, and securities handling.

At channel support layer 82, different interfaces and processing facilities support various aspects of operational layer 80. This may include user assistance applications for security audit functions as well as providing a portal into the operational aspects of the enterprise. Moreover, the enterprise resource management, custom resources management, personalization and I/O handling functions use channel support applications 82. Paper handler functions, printing and imaging, all are supported by channel support applications 82 with communication being assisted via self-service or e-commerce transactions at channel applications 84.

Basic business applications 86 may include such business software as involved party, agreement support, asset, and financial instrument applications. Moreover, common operational applications 88 may provide the different financial applications for the enterprise, such as those providing clearing information, customer ledger, bank and settlement balances, accrual and general ledger functions. For these enterprise software applications, there is the need for enterprise software support applications. In association with these enterprise software support applications, there is the need to supply support services, such as those provided by support technicians.

The present invention provides, in one embodiment, over 130 different power curves relating user levels to enterprise software support applications requirements, thus taking into consideration the full complement of software support applications that may be operating within an enterprise. FIG. 3, for instance, shows different services in table 90 that a software vendor may provide in association with a given set of software applications. Such applications may be, for example, problem management support application 92, after hours support application 94, and/or standard printer administration application 96. Thus, the many applications that an enterprise may host for software service support may be viewed as a collective or integrated set of support services for which the present invention provides a method and system for evaluating enterprise software support application costs within an enterprise architecture 70 such as that of FIG. 2.

Figures 4, 5:
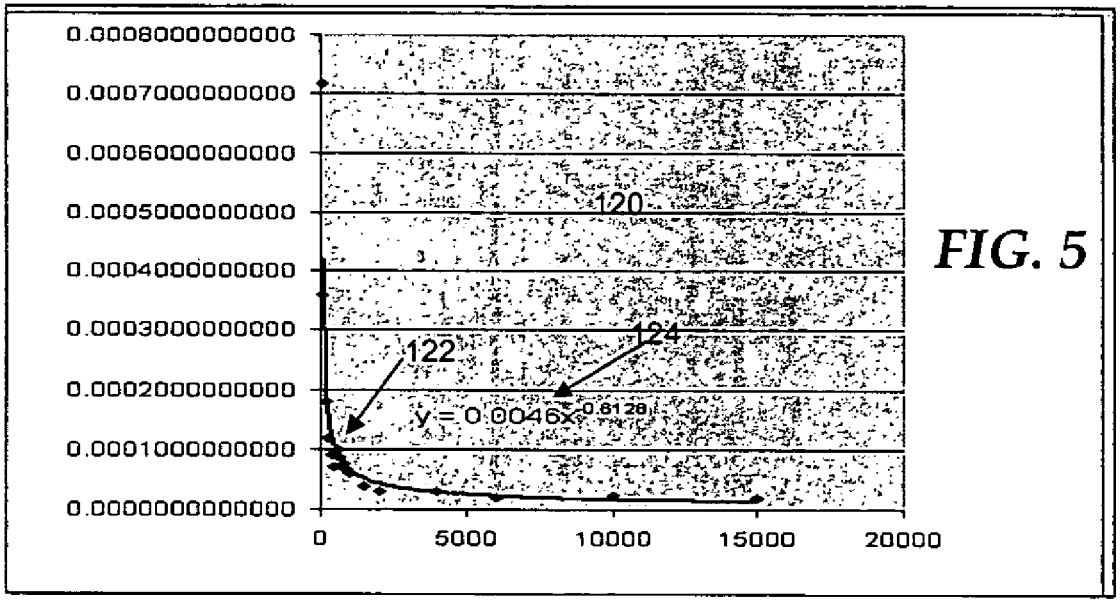
FIG. 4 depicts an example of a entry form from which the present invention may receive numerous inputs for deriving appropriate formulaic relationships relating user levels to software support requirements.
FIG. 5 provides an exemplary graphical representation of user levels to support costs from which the present invention derives a relevant formulaic relationship for software support costing.

FIG. 4 illustrates in further detail the present embodiment by depicting an example of a spreadsheet entry form from which the present invention may receive numerous inputs. It is from these inputs that the present invention derives appropriate formulaic relationships relating user levels to enterprise software support application requirements. Here, the example is for the problem management enterprise software support application 92 of FIG. 3. Problem management enterprise software support application input spreadsheet 100 includes columns that relate to parameters in the formulaic relationship that the present invention creates.

In problem management enterprise software support application spreadsheet 100 of FIG. 4, column 102 lists the different levels for the number of users that may exist within a particular enterprise. Here, as many as seventeen (17) user levels ranging from 50 to 15,000 users have been provided. Column 104 provides the estimated full-time equivalent service providers per user. Column 106 provides a constant of proportionality relating to the formulaic relationship which is constant as the name indicates, not changing as the number of users changes.

Column 108 provides an exponent for correlating the results derived by the regression analysis. The result becomes a formulaic relationship associating the number of users to the support level required for a particular enterprise software support application. As noticed, and as with the constant derived through the constant of proportionality of column 106 that the regression analysis provides and the exponent of column 108 would not change as the number of users changes. Column 110 lists the calculated full-time-equivalent (FTE) per number of users and estimated full-time equivalent per user, which uses the constant of column 106 and the exponent of column 108.

Column 112 provides a calculated estimated comparison to show the relative difference between that level of support in full-time equivalent or FTE per user as calculated in 110 compared to the estimated FTE per user of column 104. Column 114 provides the total full-time equivalent required for the given service level for the problem management service. Finally, column 116 provides a listing of the total hours that would be devoted to the support level for the given number of users and the calculated full-time equivalent per user based on the regression analysis.

The regression analysis tool performs linear regression analysis by using the "least squares" method to fit a line through a set of observations. Using regression analysis, the user can analyze how a single dependent variable is affected by the values of one or more independent variables. To run regression by using Microsoft® Excel® Analysis ToolPak®, the user arranges the data that will be analyzed in columns or rows on a worksheet, such as that of FIG. 4. Then, on the Microsoft® Excel® Tools menu, the next step is to click Data Analysis, which presents to the use an Analysis Tools box. In the Analysis Tools box, the user then clicks Regression, and enters the input range (Y range and X range) and select Line Fit Plot check box to generate a chart for estimated values and the observed values. Other instructions for performing regression analysis to generate a power curve such as that used by the present invention appear in instruction manuals for the Microsoft® Excel® spreadsheet and similar programs.

FIG. 5, therefore, shows a sample plot 10 for graphically relating problem management spreadsheet 100 to a support service level. Power curve 122, in this example, is the result of a Microsoft® Excel® regression analysis and ranges from a user base of 0 to one of 15,000 along the abscissa of plot 120. The ordinate of plot 120 shows that the calculated full-time-equivalent (FTE) per user would range on the ordinate from 0.0005185 for the minimal numbers of users, here at 50 users, to 0.0000157 for the 15,000 user base of an enterprise. The formulaic relationship 124 of power curve 122 representing the problem management service is the following:

$$Y=0.0046x^{-0.6126},$$

where: x=number of users in enterprise, and
y=number of full-time-equivalent (FTE) support technicians for given support service component (e.g., problem management)

The present invention includes the step of generating for each of the enterprise software support applications, such as those appearing in FIG. 3, a regression analysis curve and associated formulaic relationship 124.

Figure 6:
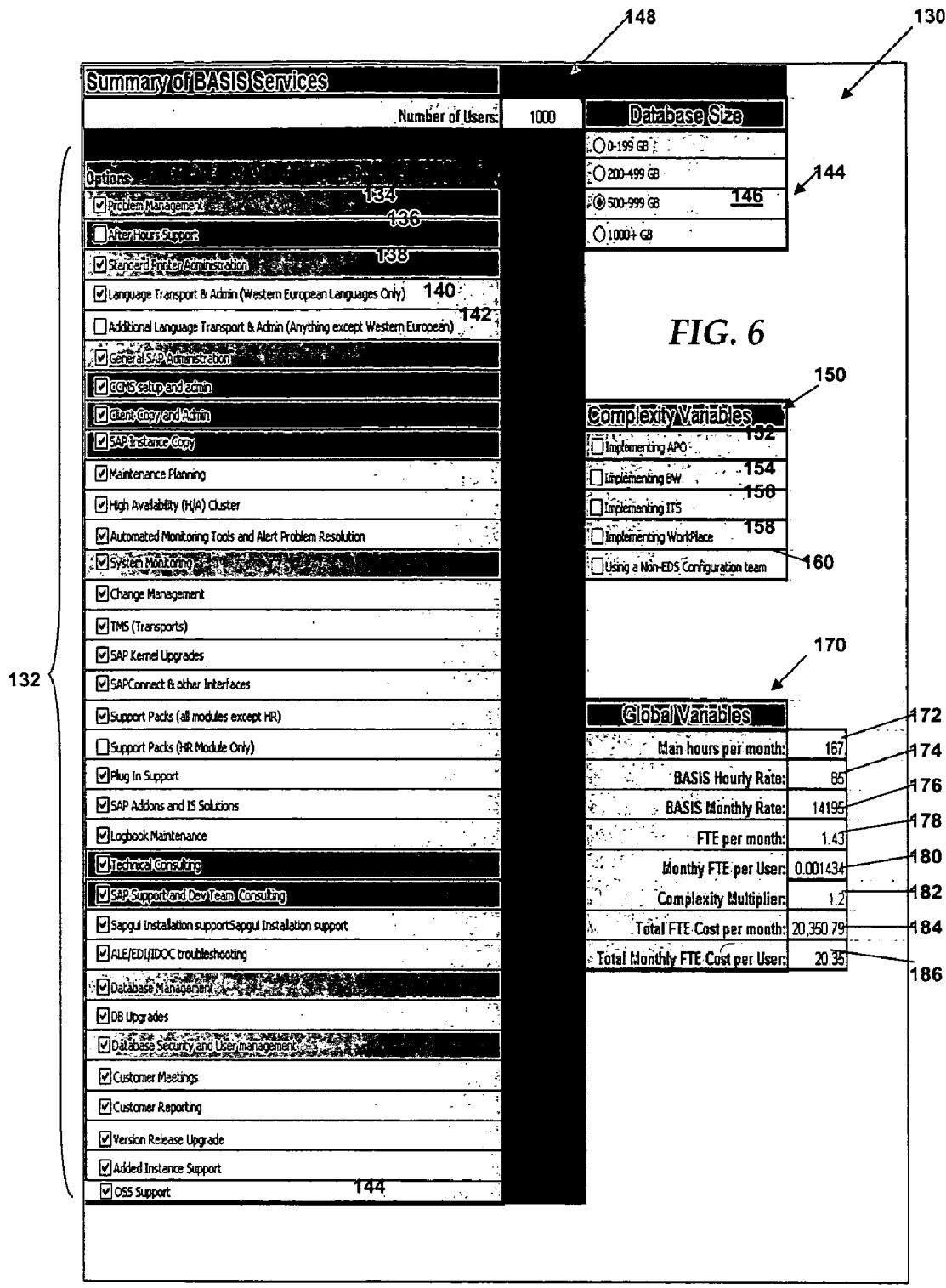
FIG. 6 show an integrated cost modeling user interface for deriving enterprise software support applications costs for an integrated enterprise software system.

FIG. 6 illustrates support cost modeling calculator 130 of the preferred embodiment for consolidating all the various regression analysis results and providing to the user a simple, but dynamic, tool for cost estimating a required level of service support for the different software applications that may be used in a particular enterprise. In FIG. 6, sample support calculator 130 appears as a user interface provided by a computer such as general purpose computer 10 of FIG. 1. Support cost modeling calculator 130 provides options that a user may select from software services list 132 which relate to enterprise software support applications for an enterprise computer system, such as enterprise computer system 70 of FIG. 2. For example, selectable options for enterprise software support applications may include problem management selection 134, after hours support selection 136, standard printer administration selection 138, language transport administration selection 140, additional language transport administration selection 142, etc., on down to OSS support selection 144, as indicated by the checkboxes appearing in enterprise software support applications list 132.

In the example of FIG. 6, a user has selected problem management support, as indicated by the checkmark in problem management selection 134, with no after hours support, as indicated by the no check in the checkbox at after hours support selection 136. Standard printer administration support, with selection 138 being checked, and language transport and administration support, with selection 140 being selected, and other selections are as indicated.

Cost modeling calculator 130, at database size portion 144, allows the user to select a database size, ranging from 0 to 199 gigabytes (GB) all the way to 1,000+ GB. In this instance, the circle at 500 to 999 GB selection 146 indicates a database size that ranges between 500 and 999 GB for the served enterprise.

In block 148, the user enters the number of users within the enterprise (here, 1000). In the present embodiment, the user base ranges from 0 to 15,000 users, although even larger user levels can be accommodated by systems formed according to the teachings of the present invention. Also, while the number of users in the example of FIG. 6 states that 1,000 users exist within the enterprise, a user could enter an arbitrary number, such as 1,250 or 1,387, for example. One attractive feature of the present invention is that, irrespective of the number a user may enter, as long as the number of users is within the range for which the cost model was established (in the present embodiment, 0-15,000), the present invention provides a precise support level value though the formulaic relationship 124.

Complexity variables portion 150 of support cost modeling calculator 130 lists various complexity variables affecting, or likely to affect, the support service level for an integrated enterprise software system 70. These complexities may, for example, include implementing APO, at selection 152, implementing BW, at selection 154, implementing ITS, at selection 156, implementing workplace, at selection 158, and using a non-EDS configuration team, at selection 160.

Finally, in global variables portion 170 there appear global variables relating to the support service required and related cost estimates. Global variables portion 170, in essence, provides output arising from the operation of the present invention. Thus, field 172 provides the man hours per month (here, 167), which is multiplied by the basis hourly rate appearing at field 174 (here, $85). This yields the basis monthly rate, at field 176 (here, $14,195). In addition, the output of the present invention includes, in field 178, the FTE per month (here, 1.43) and, taking into consideration the user base supplied in user base field 148, provides the monthly FTE per user (here, 0.001434) in field 180. The FTE per month of field 178 is calculated, in the preferred embodiment, by the above described regression analysis.

The complexity multiplier of the present invention is a function of those complexity variables that have been identified in complexity variables portion 150 of support cost modeling calculator 200. The complexity multiplier (here, 1.2) in field 182 provides the total FTE cost per month which is in essence the multiplied amount of the total FTE cost per month in field 184 (here, $20,350.79). The total monthly FTE cost per user is the result of dividing the total FTE cost per month by the number of users and appears in field 186 (here, $20.35).

Figure 7:
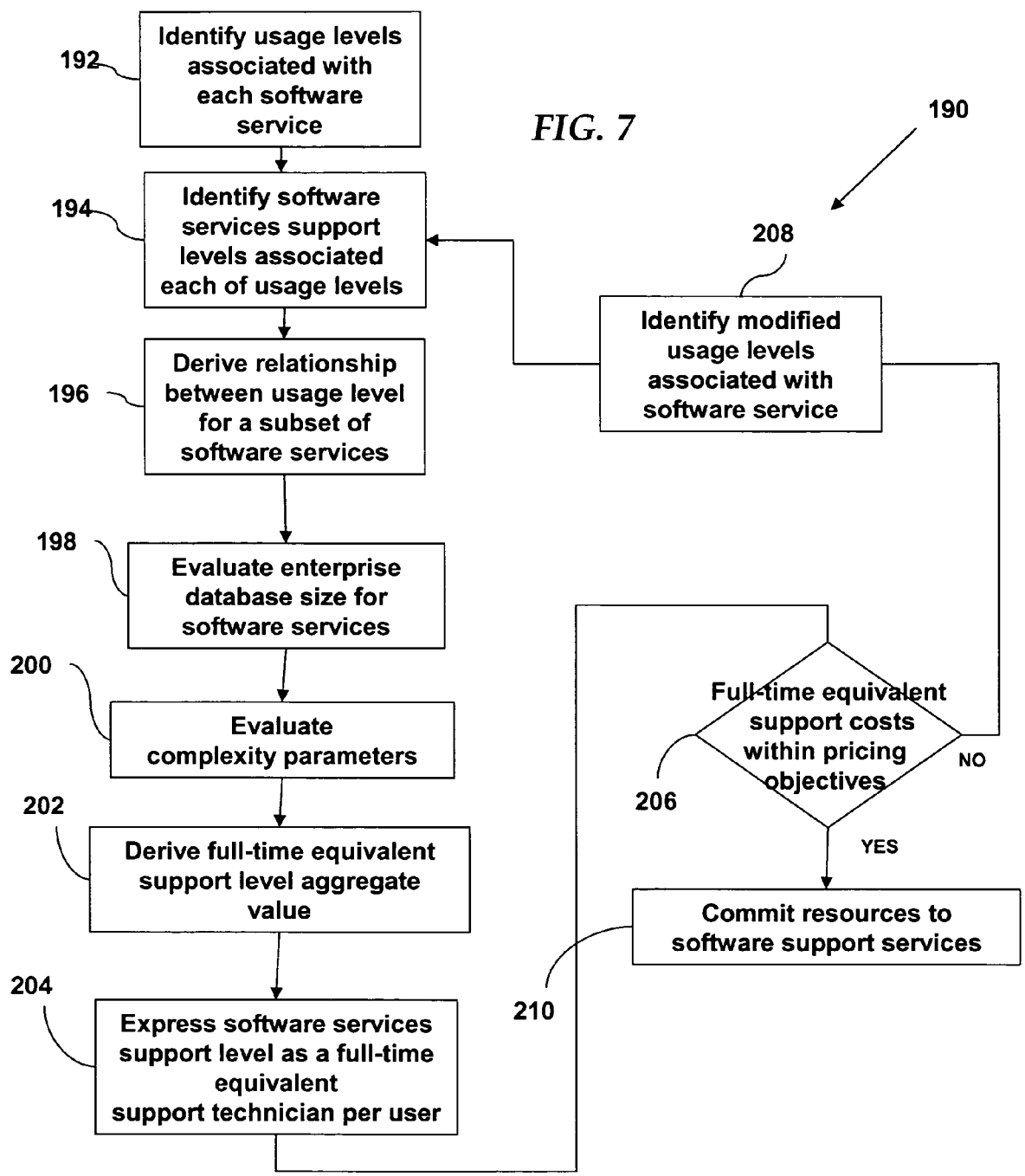
FIG. 7 presents an exemplary flowchart depicting a use of the present invention.

FIG. 7 presents an exemplary process flow 190 depicting a use of the present invention. Process flow 190 demonstrates how a user of the present invention may determine a support level for the integrated provision of an enterprise software system and includes the step of first identifying usage levels associated with the enterprise software system, at step 192. Then, process flow 190 involves identifying software services support levels associated with the usage levels for each of the support software applications, at step 194. The present invention further derives from the usage levels and support software services a formulaic relationship that determines software services support level for any given usage level for a selected subset of software services, at step 196. The example of the present embodiment expresses the formulaic relationship as an exponential relationship. In the exponential formula, the enterprise usage level is an independent parameter and software services support level is an dependent parameter which depends, at least in part, on the usage level independent parameter. Evaluating an enterprise database size for use in association with the plurality of software services occurs at step 198. Then, the present invention evaluates a plurality of complexity parameters associated with the use of the enterprise software support applications at step 200.

Process flow 190 expresses software services support levels as a full-time equivalent support technician per user parameter that is standardized globally. This permits regional solutions presentation and provision by support software application service providers. That is, at step 202, process flow 190 derives from the formulaic relationship a full-time equivalent support level aggregate value for a given enterprise. This is then expressed as full-time equivalent support technician costs per user parameter, at step 204. Process flow 190, then queries whether full-time equivalent support costs are within pricing objectives, at step 206. If the costs are not within pricing objectives of the enterprise, then the present invention permits dynamically altering the selection of software services. This occurs, for example, at step 208, wherein the user presents modified usage levels associated with software service levels. Then, process flow 190 returns to step 194, at which the present invention identifies anew the software support levels associated with each usage level of interest. This process will continue, therefore, until, at query 206, the full-time equivalent support costs are within the enterprise's pricing objectives. Then, at step 210, the enterprise appropriately commits resources to software support services that they desire and fit their financial situation.

In summary, the present invention provides a disciplined approach to software maintenance using a framework that allows an enterprise to move from ad hoc, often chaotic, software support process to an organized method and system that supports a continuous loop of learning and innovation. The present invention is organized into user levels and satisfies the principles and practices underlying software support process success. That is, real gains in efficiency and cost-savings arise from the present invention's providing for 1) repetition; 2) specialization; 3) standardization and 4) automation in the software support service costing problem.

The present invention enables an enterprise to control the software support and maintenance process by providing a repeatable process capable of arriving at consistent results in software support cost evaluations. Because its use can be specialized, the present invention provides a highly granular approach to the costing problem, the present invention addresses specific business needs of different enterprises that reflect their specific enterprise software environment. At the same time, the present invention also allows for standardization across the general user community. The standardization occurs through the automation of the cost modeling made possible with the present invention.

In summary, the present invention addresses the concern for achieving reliable cost estimates for use in budgeting and monitoring the costs of servicing and maintaining enterprise software support applications. The present invention provides an economical and practical technical and business solution to the problem. Accordingly, the embodiments of the invention herein described, it should to be understood, are merely illustrative of the application of the principles of the invention. Reference herein to details of the illustrated embodiments, therefore, is not intended to limit the scope of the claims, which themselves recite those features regarded as essential to the invention.

We claim:

1. A method for determining a support level for the integrated provision of a plurality of enterprise software support applications, comprising the steps of:
    storing a plurality of usage levels associated with each of a plurality of enterprise software support applications in a computer system;
    storing a plurality of software services support levels associated with each of said usage levels in the computer system;
    performing a regression analysis by the computer system using said plurality of usage levels and said plurality of software services support levels to determine and store a formulaic relationship that indicates a software services support level for a given usage level for a subset of said plurality of enterprise software support applications;
    displaying said formulaic relationship as an exponential relationship whereby said given usage level comprises an independent parameter and said indicated software services support level comprises a dependent parameter depending, at least in part, on said independent parameter; and
    evaluating a total full-time equivalent cost per user for support services relating to the integrated provision of the plurality of enterprise software support applications.

2. The method of claim 1, further comprising the step of displaying said indicated software services support level as a fulltime equivalent support technician per user parameter.

3. The method of claim 1, further comprising the step of displaying said indicated software services support level as a globally standardized parameter.

4. The method of claim 1, further comprising the step of deriving from said formulaic relationship, by the computer system, a full-time equivalent support level aggregate value for a given enterprise.

5. The method of claim 1, further comprising the step of evaluating a plurality of complexity parameters associated with the use of said plurality of enterprise software support applications within an enterprise.

6. The method of claim 1, further comprising the step of evaluating an enterprise database size for use in association with said plurality of enterprise software support applications.

7. The method of claim 1, further comprising the step of dynamically altering the selection of enterprise software support applications within said plurality of software services.

8. The method of claim 1, further comprising the step of using said plurality of usage levels as a continuous independent variable of said formulaic relationship.

9. A computer system for determining a support level for the integrated provision of a plurality of enterprise software support applications, comprising:
    a processing unit;
    a computer-readable media accessible by the processing unit and storing computer-executable instructions, the computer-executable instructions including
    instructions for storing a plurality of usage levels associated with each of a plurality of enterprise software support applications;
    instructions for storing a plurality of software services support levels associated with each of said usage levels;
    instructions for performing a regression analysis by the computer system using said plurality of usage levels and said plurality of software services support levels to determine and store a formulaic relationship that indicates a software services support level for a given usage level for a subset of said plurality of enterprise software support applications;
    instructions for displaying said formulaic relationship as an exponential relationship whereby said given usage level comprises an independent parameter and said indicated software services support level comprises a dependent parameter depending, at least in part, on said independent parameter; and
    instructions for evaluating a total full-time equivalent cost per user for support services relating to the integrated provision of the plurality of enterprise software support applications.

10. The system of claim 9, wherein the computer-executable instructions further include instructions for displaying said indicated software services support level as a full-time equivalent support technician per user parameter.

11. The system of claim 9, wherein the computer-executable instructions further include instructions for displaying said indicated software services support level as a globally standardized parameter.

12. The system of claim 9, wherein the computer-executable instructions further include instructions for deriving from said formulaic relationship a full-time equivalent support level aggregate value for a given enterprise.

13. The system of claim 9, wherein the computer-executable instructions further include instructions for evaluating a plurality of complexity parameters associated with the use of said plurality of enterprise software support applications within an enterprise.

14. The system of claim 9, wherein the computer-executable instructions further include instructions for dynamically altering the selection of software support services for said plurality of enterprise software support applications.

15. The system of claim 9, wherein the computer-executable instructions further include instructions for using said plurality of usage levels as a continuous independent variable of said formulaic relationship.

16. A computer-readable storage medium storing computer-executable instructions, the computer-executable instructions comprising:
    instructions for storing a plurality of usage levels associated with each of a plurality of enterprise software support applications;

instructions for storing a plurality of software services support levels associated with each of said usage levels;

instructions for performing a regression analysis by the computer system using said plurality of usage levels and said plurality of software services support levels to determine and store a formulaic relationship that indicates a software services support level for a given usage level for a subset of said plurality of enterprise software support applications;

instructions for displaying said formulaic relationship as an exponential relationship whereby said given usage level comprises an independent parameter and said indicated software services support level comprises a dependent parameter depending, at least in part, on said independent parameter; and instructions for evaluating a total full-time equivalent cost per user for support services relating to the integrated provision of the plurality of enterprise software support applications.

17. The storage medium of claim 16, the computer-executable instructions further comprising instructions for expressing said indicated software services support level as a full-time equivalent support technician per user parameter.

* * * * *